Sept. 22, 1959     H. MILSTEIN     2,905,060
TOOL CARRIAGE FEEDING AND LOCATING MECHANISM
Filed May 3, 1957     3 Sheets-Sheet 1

INVENTOR.
HERMAN MILSTEIN
BY
Hyman Jackman
ATTORNEY

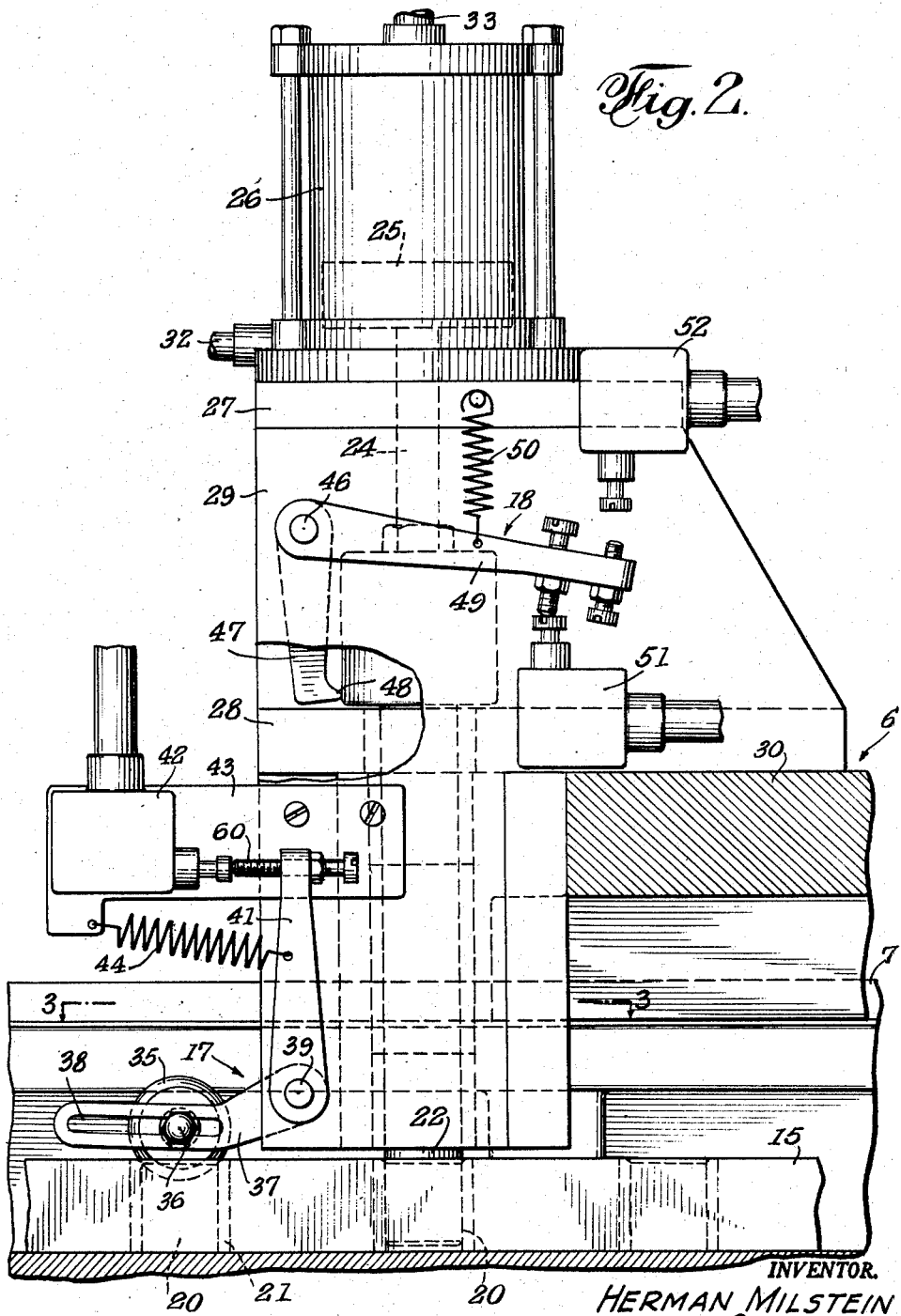

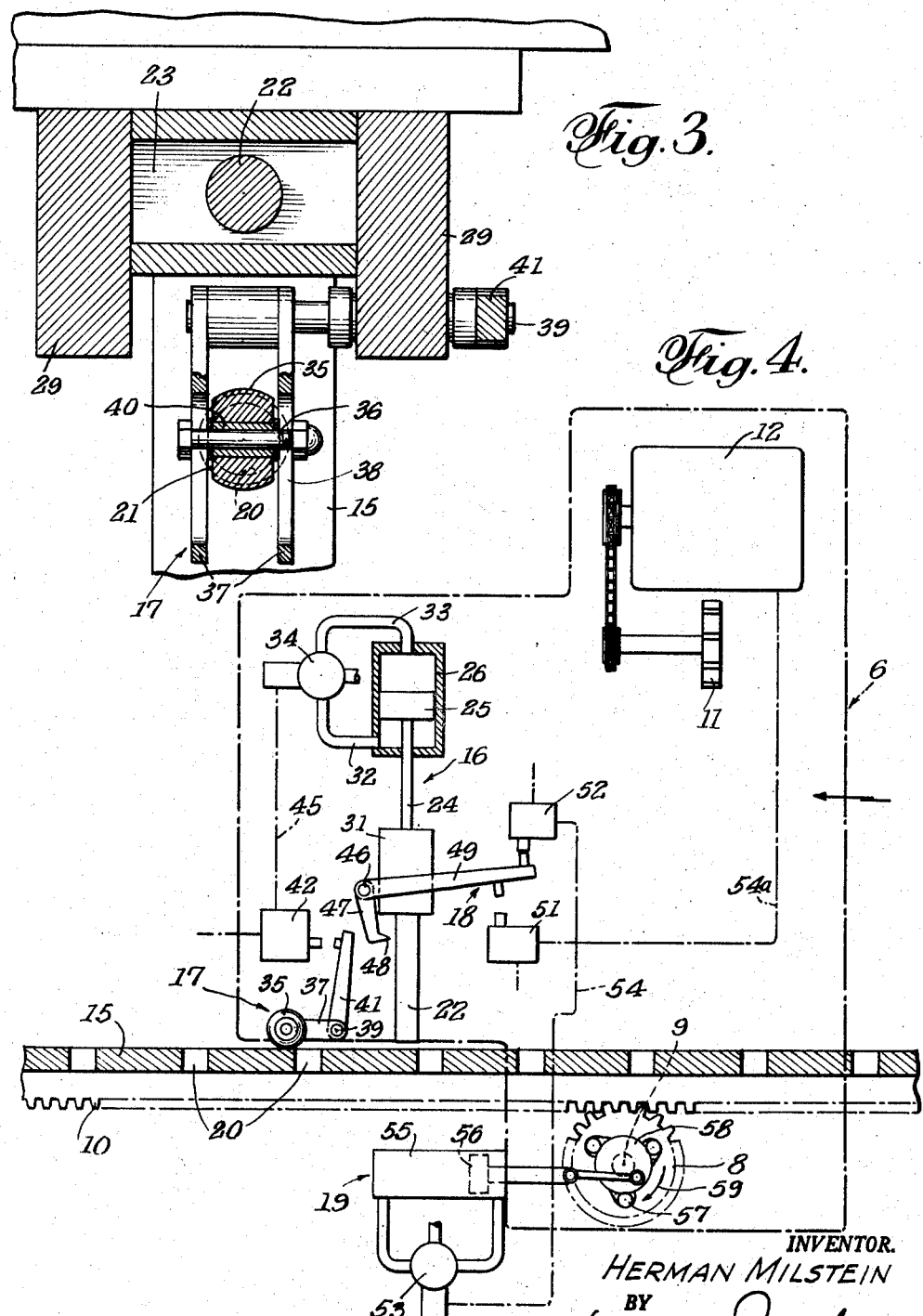

United States Patent Office 2,905,060
Patented Sept. 22, 1959

2,905,060

TOOL CARRIAGE FEEDING AND LOCATING MECHANISM

Herman Milstein, Los Angeles, Calif., assignor, by mesne assignments, to Dumont Milling Industries, Division of Dumont Aviation Associates Application May 3, 1957, Serial No. 656,927

9 Claims. (Cl. 90—11)

This invention relates to a mechanism for feeding a tool carriage and for accurately locating the same relative to a piece of work, whereby the tool of said carriage cuts into or performs work upon a workpiece at longitudinally spaced intervals. Notching elongated hinge butts is one example of the type of work adapted to be performed by the present mechanism.

An object of the present invention is to provide a feeding and locating mechanism which, while adapted for manual control, as when setting up or for other reasons, automatically effects a sequential operation that intermittently feeds a tool carriage to accurately spaced successive positions while alternately operating a tool on said carriage to perform work on a workpiece during the periods of rest of the carriage.

Another object of the invention is to provide mechanism of the character referred to that embodies novel, simple and improved means to move the carriage to an accurate location and to lock the same against shift under control of the locking means employed for that purpose.

A further object of the invention is to provide mechanism of the character above referred to in which the locking means, having two positions, alternately, initiates carriage feed, in one position, and tool operation, in the other.

A still further object of the invention is to provide simple and accurate means that automatically enters successive longitudinally spaced holes or cavities, the same automatically and accurately locating a tool carriage relative to an elongated member provided with such spaced holes or cavities, thereby facilitating proper locking of the carriage to said elongated member to hold the same in position for the tool of said carriage to accurately perform its work on a workpiece immovably held in relation to the hole-provided member.

The invention also comprises the details, combinations and arrangements of parts disclosed, by way of example, in the accompanying drawings. The foregoing and other objects, features and advantages of the invention will become more readily evident as the following description progresses, the same being based on said drawings, in which:

Fig. 2 is a vertical sectional view taken substantially on the line 2—2 of Fig. 1.

Fig. 3 is a cross-sectional view as taken on the line 3—3 of Fig. 2.

Figure 1:
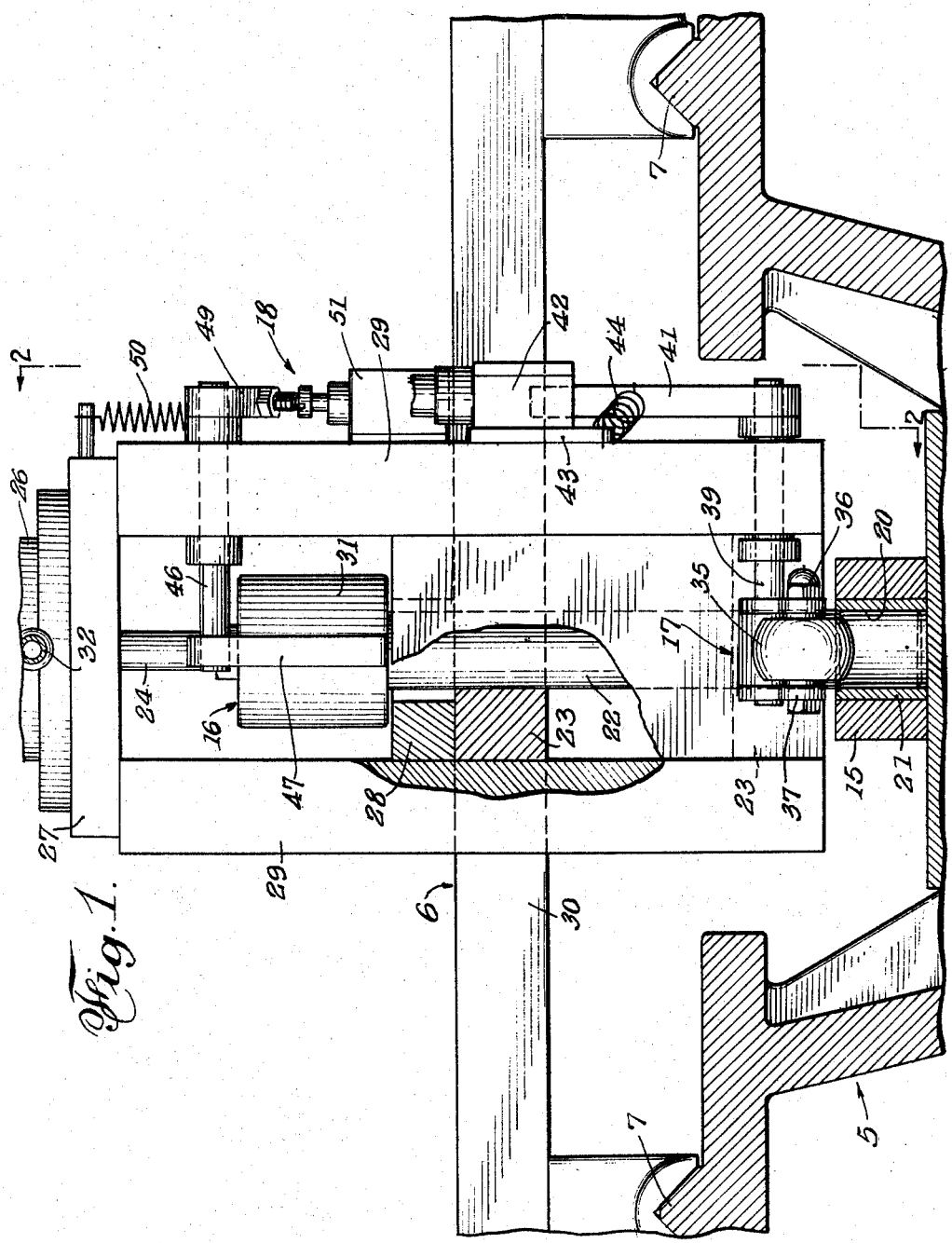
Fig. 1 is a partial end elevational and partial sectional view of carriage feeding and locating means in which the objects of the invention are realized.

Fig. 4, to a reduced scale and in semi-diagrammatic form, is a view showing the present mechanism in one environment of use thereof.

As best seen in Fig. 1, the present mechanism is based, by way of example, on a lathe bed 5 or similar elongated support, a carriage 6 being mounted on ways 7 of the lathe bed and movable longitudinally therealong. As indicated in Fig. 4, the carriage may carry a gear 8 that is rotational on an axis 9, and the lathe bed may be provided with a gear rack 10 with which said gear is in driving mesh. It will be clear that rotation of gear 8 produces longitudinal traverse of the carriage 6 relative to the lathe bed 5. The carriage also mounts a tool 11, here shown as a rotary cutter that, by means of a motor 12, is driven when said motor is energized. The tool and its driving means may vary and the tool may be mounted to move bodily as well as rotating to perform its work. The tool, per se, and its movement relative to the carriage do not comprise features of the invention and may be adapted in various known ways.

According to the present invention, the feeding and locating mechanism that is illustrated comprises, generally, an orifice bar 15 fixedly secured to and in longitudinal disposition along the lathe bed 5, locking means 16 mounted on the carriage 6 to engage said bar 15 and, thereby, lock the carriage to the lathe bed, means 17 to control the locking means, and, in turn, controlled by the orifice bar, means 18 under control of the locking means to control operation of the tool 11 and, alternately, to operate means 19 to control rotation of the gear 8 and, therefore, the feed of the carriage.

The bar 15 is affixed to the lathe bed in any suitable longitudinal position and preferably between the ways or guides 7. Said bar is provided with a set or complement of holes, seats or orifices 20 that are here shown as being the bores of hardened bushings 21 that are pressed into the bar and in preferably vertical disposition, substantially in the manner shown. Said orifices are longitudinally aligned and the spacing from one to the other is as accurately the same as is practicable. In this manner, the lathe bed is provided with an accurately spaced set of carriage-locating orifices.

The locking means 16 preferably comprises a vertical bolt 22 of a diametral size to enter and, with minimum play, fit the orifices 20. The carriage 6 provides bearing plates or members 23 to guide the bolt 22 for vertical movement to assure minimum of play between said bolt and the carriage. The means 16 further comprises a stem 24 forming an upper extension of the bolt 22, a piston 25 on the upper end of the stem, and a pressure-fluid cylinder 26 in which said piston operates and which is mounted on an upper plate 27 of said carriage. Said plate 27 together with bearing plates 23 and a support plate 28 comprise transverse elements of the carriage 6, the latter also having side plates 29 connected to the carriage base frame 30 and serving to integrate the mechanism-supporting frame. A diametrally enlarged cam-like member 31 is interposed between the bolt 22 and the stem 24, the same being disposed between plates 27 and 28 and of a length to be able to move vertically with the bolt when said bolt moves between locking and releasing positions. Such movement is here effected under control of pressure fluid admitted into cylinder 26. Fluid admitted through connection 32 effects withdrawal of the bolt, and fluid admitted through connection 33 produces locking movement of the bolt.

As shown in Fig. 4, such fluid control may be carried out by means of a solenoid valve 34, if the operation is electrically controlled. In any case, a valve may be actuated to bolt-locking and bolt-releasing positions, the solenoid valve shown being by way of example.

The means 17 is shown as comprising a roller 35 of spherical form and which, by means of an axle 36, is mounted on an arm 37 to be adjustable therealong, a slot 38 being provided in said arm for the purpose of affording such adjustment. In the present case, arm 37 is shown as longitudinally bifurcated, the roller 35 being disposed in the bifurcation. A rockshaft 39, journalled in one of the carriage side plates 29 carries arm 37. The roller is freely rotational and, to this end, the same is mounted on a bushing or sleeve 40 around the axle 36 (Fig. 3), said sleeve being adapted to be clamped by its ends when the adjustment of the roller along the arm 37 is locked. It will be clear that roller 35 is adapted to drop into the top of an orifice 20 when aligned therewith, as in Fig. 1, and to ride the upper surface of bar 15, when between orifices, as in Fig. 4.

Extreme accuracy is necessary in the longitudinal spacing between the bolt 22 and the roller 35 because the latter, when it drops into an orifice 20 automatically centers itself therein and, when so centered, must so relate the carriage 6 with the orifices of the bar 20 that the bolt is accurately aligned with one of said orifices, preferable the next orifice to the one in which the roller 35 has dropped. The slot 38 enables accurate location of the roller 35 along arm 37, thereby insuring such accuracy of operation. This adjustment is easily effected by loosening the roller axle 36 while the bolt 22 is in an orifice 20, allowing the roller to be shifted until it drops into the next adjacent orifice and to become automatically centered therein, and, then locking said axle to the arm 37 and, at the same time clamping the sleeve 40 against rotation, as above indicated. Now, each time the roller drops into an orifice 20, the bolt 22 will be in accurate alignment with an adjacent orifice.

The means 17 further includes an arm 41 so affixed to shaft 39 that the same, together with arm 37, forms a bellcrank. Thus, the arm 41 rocks on the axis of shaft 39 as the roller 35 enters or is raised out of an orifice 20. A switch 42 is shown as being controlled by this movement of arm 41, said switch being mounted on one of the carriage side plates 29 by a bracket 43. A spring 44 between said bracket and the arm 41, serves to resiliently bias the roller 35 in an orifice-entering direction.

The switch 42 controls the solenoid valve 34, as by a suitable electrical connection 45 (Fig. 4). As hereinbefore indicated, the flow of pressure fluid to the cylinder 26 may be directly controlled by a valve and said valve may be actuated by the arm 41.

The means 18 is shown as a rockshaft 46 journalled in one of the carriage wall plates 29, an arm 47 on one end of said shaft and having a toe end 48 in operative association with the cam-like member 31, and a second arm 49 on the other end of the rockshaft 46 and preferably disposed on the outer side of said plate 29. A spring 50 biases the bellcrank thus provided in a direction that presses the end 48 of the arm against the member 31. Thus, the latter bellcrank has two positions; one, as in Fig. 2, with the toe end 48 held in an outward position by engagement with the member 31, and the other, as in Fig. 4, with the toe end 48 pressed inward toward the bolt 22 due to the raised position of the member 31. In the first position, arm 49 is raised and in the second lowered or depressed.

In its lowered or depressed position, the arm 49 actuates a switch 51 that controls the motor 12 or other driver for the tool 11 through an electrical connection 54a. In the raised position of the arm, the same operates the means 19.

Said means 19 comprises a switch 52 in position to be actuated by the arm 49, a solenoid valve 53 controlled by said switch through an electric connection 54, a cylinder 55 receiving pressure fluid under control of the valve 53 in the same way that the valve 34 controls flow to the cylinder 26, and a piston 56 that is projected or retracted according to whether the valve 53 directs fluid to one end or the other of cylinder 55.

A one-way clutch mechanism 57 operatively interengages the gear 8 and a shaft 58 on the axis 9, it being understood that rotation of the shaft 58 in one direction—the direction of the arrow 59—produces rotation of the gear 8 in the same direction. Such rotation of the gear 8 will cause the carriage 6 to move toward the left because of the meshing engagement of the gear 8 with the fixed rack 10. Rotation of the shaft 58 in the opposite direction merely allows the clutch mechanism to slip, thereby producing no motion of the gear 8 nor of the carriage 6. By connecting the piston 56 to the end of shaft 58 by means of a link so that said shaft may be oscillated, in the manner of a crank, each time that the piston 56 is retracted, the carriage 6 will be advanced.

*Operation*

Starting with the mechanism in the position of Fig. 2, the carriage 6 being locked to the bed 5 and the tool being driven because the switch 51 is closed, any means controlled by bodily movement of the tool, as it operates upon a workpiece, or any other control, may be employed to so operate the valve 34 that pressure fluid is introduced into the cylinder 26 beneath the piston 25. Thus, the bolt 22 is withdrawn from locking engagement with the orifice bar 15. This retracted position of bolt 22 (shown in Fig. 4) is the initial position insofar as this mechanism is concerned.

Such valve-controlling means does not constitute a feature of the invention because the cycle of operation of the present mechanism starts when the bolt 22 is retracted, is continued as the carriage 6 is moved to a new position, and is completed when the carriage is re-locked by projection of the bolt. The valve 34 may be manually actuated, at any subsequent time, to again retract bolt 22; or any part, such as the cutter 11, as it completes its feed-in movement on the workpiece it is operating on, may be connected to actuate valve 34 to cause flow of pressure fluid in line 32. In other words, the mechanism remains locked by bolt 22 until any suitable means, as explained above, retracts the bolt. It is this retraction that institutes index of the mechanism to the next position.

Upon such retraction of bolt 22, the toe 48 will be released to open the circuit to motor 12 and thus stop operation of the tool 11. In immediate sequence, the switch 52 is closed to institute traversal drive of the carriage 6 by the means 19. Since the spherical roller 35, due to its ability to freely rotate, will be forced out of the orifice in which it had entered, the arm 41 will become tilted in a direction to release switch 42. The latter switch is of the momentary contact type and the same is thus set to close momentarily when again actuated by the arm 41.

During such carriage movement, nothing else occurs until the roller 35 reaches the next orifice 20 in the bar 15. As said roller drops into said next orifice and centers itself therein, switch 42 is momentarily actuated to energize the solenoid of valve 34 and cause said valve to open to conduct pressure fluid into the upper end of cylinder 26. In practice, the switch 42 may be actuated before the roller becomes fully seated, the actuator means 60 on arm 41 being adjustable as desired. Comparable adjustable actuator means may be provided, as shown, on the arm 49 for accurate control thereby of the switches 51 and 52.

Pressure fluid in the upper end of the cylinder 26 causes the bolt 22 to be forced downward, and because it finds an orifice 20 accuratey aligned therewith, effects locking of the carriage to the lathe bed. At the same time, the member 31 moves downwardly and, by re-engaging the toe end 48, re-rocks the arm 47, against the bias of spring 50, to move the arm 49 into operative engagement with the switch 51 to start up operation of the tool 11. As a consequence, switch 52 is opened and the traverse drive of the carriage is stopped. In fact, the drive stops first because the switch 52 is opened before the switch 51 is closed. At this time, the valve 53 re-sets itself to cause the piston 56 to re-project and ready the means 19 to operate upon the next energization of the switch 52.

While I have described what I now regard as the best mode of constructing my invention, the same is subject to modification within the spirit and scope of the appended claims. Therefore, I do not wish to restrict myself to the particular form of my invention that is illustrated and described, but desire to avail myself of all modifications and variations thereof that may fall within the scope of said claims.

Having thus described my invention, what I claim and desire to obtain by Letters Patent is:

1. Mechanism of the character described comprising a longitudinal fixed support provided with a set of uniformly and longitudinally spaced orifices, a carriage mounted on said support to move longitudinally therealong and provided with a tool adapted to operate on a workpiece fixedly mounted on the support, a locking bolt carried by the carriage, carriage-locating means on the carriage longitudinally spaced from the bolt a distance equal to the spacing of the orifices, said locating means including a spherical element enterable into said orifices, successively, and adapted to center itself in the orifice into which entered to accurately align the bolt with another of said orifices, and means controlled by the locating means to move the bolt into the orifice with which aligned to, thereby, lock the carriage immovably with respect to the support and the workpiece.

2. Mechanism according to claim 1 in which the spherical element is carried on an arm pivotally mounted on the carriage, the arm being engaged and controlling the bolt-moving means.

3. Mechanism according to claim 1 in which the spherical element is freely rotationally mounted and, thereby, adapted to freely roll during movement into and out of an orifice.

4. Mechanism according to claim 1 in which the spherical element is freely rotationally mounted and, thereby, adapted to freely roll during movement into and out of an orifice, and means to adjust the longitudinal spacing of the bolt and the spherical element to exactly conform the same to the longitudinal spacing of the orifices.

5. In a machine having a longitudinal fixed support provided with a set of uniformly and longitudinally spaced orifices, there being a carriage mounted on the support to move longitudinally therealong, said carriage being provided with a tool for operating on a workpiece fixedly mounted on the support, the improvement that comprises a locking bolt carried by the carriage and enterable into said orifices to lock the carriage to the support, means to move the bolt between projected locking position and retracted carriage-releasing position, carriage-locating means on the carriage longitudinally spaced from the bolt a distance equal to the spacing of the orifices, said locating means including a spherical element enterable into said orifices, successively, and adapted to center itself in the orifice into which entered to accurately align the bolt with another of said orifices, and means controlled by the locating means to control the bolt-moving means to move the bolt to projected locking position upon the spherical element entering an orifice.

6. In a machine according to claim 5, means to move the carriage along the support, and means controlled by the bolt during movement thereof toward retracted position to operate the carriage-moving means.

7. In a machine according to claim 5, the tool being provided with driving means, and means controlled by the bolt during movement thereof to projected carriage-locking position to operate said tool-driving means.

8. In a machine according to claim 7, means to move the carriage along the support, and means controlled by the bolt during movement thereof toward retracted position to operate the carriage-moving means.

9. In a machine according to claim 5, the spherical element being carried on a movable member, and means resiliently biasing the member in a direction toward the fixed support, whereby the spherical element rolls along said support between orifices and smoothly enters an orifice as it approaches the same.

References Cited in the file of this patent

UNITED STATES PATENTS

| 2,283,338 | Pegard | May 19, 1942 |
| 2,565,853 | Jacobson | Aug. 28, 1951 |
| 2,575,945 | De Vlieg | Nov. 20, 1951 |
| 2,812,580 | Masinda | Nov. 12, 1957 |

FOREIGN PATENTS

| 281,777 | Great Britain | Dec. 12, 1927 |